Dec. 3, 1957  R. F. KILLEY ET AL  2,815,334
CATALYST INJECTION IN LOW TEMPERATURE POLYMERIZATIONS
Filed Sept. 13, 1955
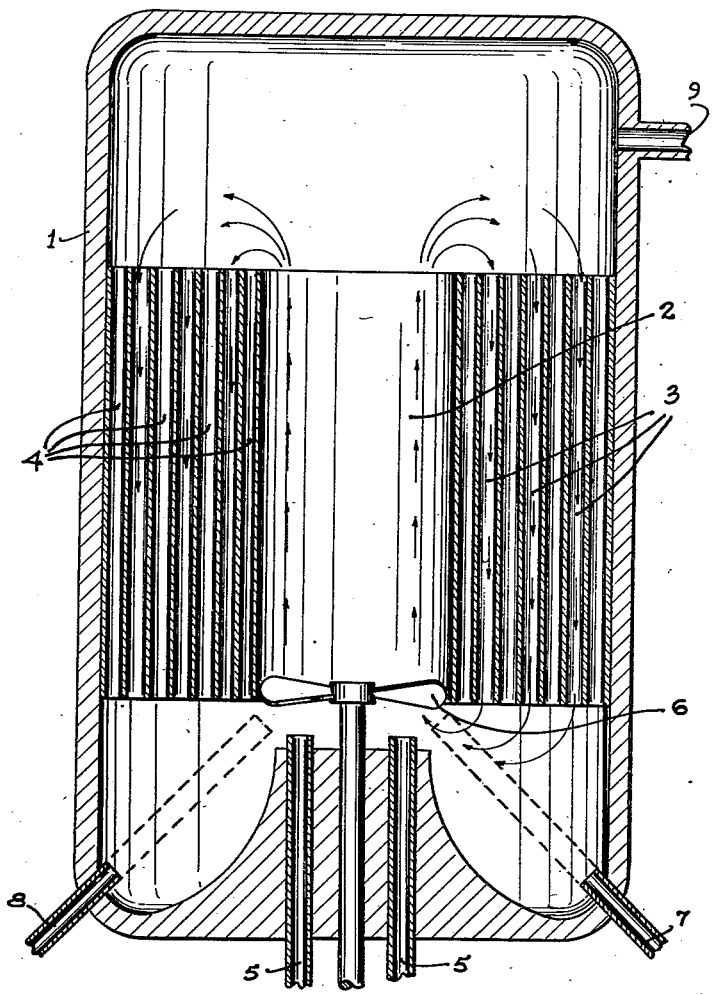
Inventors
Robert F. Killey
Donald H. Welch
Charles A. McKenzie
by Stevens, Davis, Miller & Mosher
their attorneys

United States Patent Office 2,815,334
Patented Dec. 3, 1957

2,815,334

CATALYST INJECTION IN LOW TEMPERATURE POLYMERIZATIONS

Robert F. Killey, Donald H. Welch, and Charles A. McKenzie, Sarnia, Ontario, Canada, assignors to Polymer Corporation Limited, Sarnia, Ontario, Canada, a corporation of Canada Application September 13, 1955, Serial No. 533,964

Claims priority, application Canada June 30, 1955

14 Claims. (Cl. 260—85.3)

This invention relates to the low temperature catalytic polymerization of isoolefinic material, more particularly isobutylene, with or without copolymerizable materials. The term "polymerization" includes "copolymerization," for example, the copolymerization of isoolefinic materials with multi-olefinic materials.

It has previously been suggested that it is possible to polymerize isoolefinic materials, such as isobutylene, either alone or mixed with a multi-olefin, such as isoprene or butadiene-1,3, at temperatuers as low as $-164°$ C. ($-264°$ F.) under the influence of a Friedel-Crafts catalyst, such as aluminum chloride or boron trifluoride. It has been suggested to use a non-complex-forming, inert, low freezing diluent which was a non-solvent for the final polymer, such as methyl chloride or ethyl chloride, as the reaction medium. In these polymerizations, the molecular weights of the polymers are said to range as high as 500,000.

It has been suggested carrying out these polymerizations in a reaction vessel having a large diameter central tube surrounded by a plurality of small diameter tubes. These tubes form a plurality of circulating passages for the reactor contents.

It was also the custom to surround these tubes with a cooling jacket through which a refrigerant solution would pass. This reactor was also equipped with an agitator for circulating the reactor contents, inlet tubes for the feeding of the monomer solutions and the catalyst solutions, and, normally an outlet tube.

The most important type of polymers produced by this type of reaction are known as "butyl rubbers." In this application, "butyl rubber" is defined as a vulcanizable elastic copolymer of isobutylene and small amounts of diolefins.

One suitable method which has been suggested for the production of butyl rubber was to send a stream of methyl chloride, containing up to about 26% by weight isobutylene and up to about 5% by weight isoprene into the reactor where, on contacting a catalyst in the form of a stream of methyl chloride containing about 0.25% by weight aluminum chloride, polymerization takes place. Because the polymerization is an exothermic reaction, the aforementioned refrigerating jacket is provided to keep the temperature of the reactants at the desired level.

In these polymerizations, the monomers were normally fed as a "dilute feed" or as a "full strength feed."

The term "dilute feed" is here meant to mean a solution containing less than about 8% by weight and preferably 2–6% by weight of an isoolefinic material, such as isobutylene, in an inert diluent, such as methyl chloride or ethyl chloride.

The term "full strength feed" is here meant to mean a solution containing about 20–40% by weight of an isoolefinic material, such as isobutylene, with or without about 0.2–2.0% by weight of a multi-olefin having at least two centres of unsaturation, such as isoprene, in an inert diluent, such as methyl chloride or ethyl chloride.

It has been found that superior polymers are produced at low temperatures. For example, it has been found that, using methyl chloride as the diluent, good polymers were obtained using a cooling jacket refrigerant temperature of about $-155°$ F. Still better polymers may be obtained at even lower temperatures but, hitherto, it has been found impractical to carry out such polymerization reactions at cooling jacket temperatures lower than $-155°$ F., partly because of the very short reaction runs which frequently followed and partly because of the long induction periods experienced on reactor start-ups.

The very short reaction runs which resulted in these polymerizations at cooling jacket temperatures lower than $-155°$ F. have now been increased according to a method described and claimed in applicants' copending application Serial No. 531,824. That invention provides a method for the polymerization of an isoolefinic material containing 4–8 carbon atoms, such as isobutylene, with or without a copolymerizable multi-olefinic material containing 4–14 carbon atoms and having at least two centres of unsaturation, such as isoprene, in a reactor having circulating passages and a cooling jacket comprising feeding into the reactor so as substantially to fill said passages a dilute feed of said isoolefinic material in an inert diluent which is a non-solvent for the final polymer, said dilute feed being fed at a temperature above its freezing point; then circulating this solution through said passages; and then circulating in said cooling jacket a refrigerant at a temperature below $-155°$ F. The refrigerant is circulated at a correlated rate together with the feeding of a full strength feed of said isoolefinic material alone, if there is to be no copolymerization, or a full strength feed of said isoolefin material and said multi-olefinic material if there is to be copolymerization, in an inert diluent which is a non-solvent for the final polymer, so that when the refrigerant completely fills said cooling jacket, the contents of the reactor is a solution of the required concentration of monomers, before the catalyst solution is added. The process is continued by feeding a solution of a Friedel-Crafts catalyst in an inert diluent which is a non-solvent for the final polymer, said solution of catalyst being fed at a temperature about its freezing point. Preferably, these solutions are fed continuously so that the overflow from one reactor is used to fill another similar type reactor. This continuous process is extremely advantageous, although the specific examples given are not specifically related thereto.

It should be noted that long induction periods not only result in a loss of time, but also result in other difficulties. Often, special vigilance is required on the part of the operator because, by the time reaction does begin, an excessively large amount of catalyst may have been added to the reactor. This results in an uncontrolled polymerization known as a "runaway" reaction.

Furthermore, in such a reaction, local temperature peaks may result in the production of low molecular weight polymers. These polymers not only are undesirable in the final product, but also are very tacky and thus adhere to the reactor walls and heat transfer surfaces. The resulting loss in heat exchange efficiency will preclude long reactions.

It has been suggested overcoming these difficulties by using more dilute monomeric feed stocks on start-up. While being of some help when the polymerization occurs at reactor refrigerant temperatures of $-145°$ to $-150°$ F., it is of little use when reactor refrigerant temperatures of about $-155°$ F. or lower are used.

It is therefore an object of the present invention to provide means for substantially reducing the aforementioned long induction periods at reactor refrigerant jacket temperatures lower than $-155°$ F.

Another object of the present invention is to provide a method which will greatly reduce the possibility of reactions going out of control on start-up due to the presence of excessively large amounts of catalyst in the reactor.

A further object of this invention is to provide a method whereby the amount of low molecular weight polymer produced on start-up is greatly reduced.

The process of the present invention provides a method for the low temperature catalytic polymerization of isoolefinic material in a reactor having circulating passages and a cooling jacket, comprising feeding into the reactor, so as substantially to fill said passages, a solution of said isoolefinic material in an inert diluent which is a non-solvent for the final polymer, said solution being fed at a temperature above its freezing point; then circulating said solution through said passages; then circulating in said cooling jacket a refrigerant at a temperature below $-155°$ F.; then feeding a Friedel-Crafts catalyst to a point adjacent the point of feed of said isoolefinic material until the reaction is initiated, said catalyst being fed in the form of a solution in an inert diluent which is a non-solvent for the final polymer and at a temperature above the freezing point of said catalyst solution; and then feeding such catalyst solution to a point remote from said point of feed of isoolefinic material.

The principal process of the present invention is for the production of "butyl rubber." The present invention, therefore, provides a method for the low temperature catalytic copolymerization of isobutylene and isoprene in a reactor having circulating passages and a cooling jacket comprising feeding into the reactor so as substantially to fill said passages, a dilute feed of said isobutylene in a methyl chloride diluent, said dilute feed being fed at a temperature above its freezing point; then circulating said solution in said circulating passages; then circulating in said cooling jacket a refrigerant at a temperature below $-155°$ F. and feeding, substantially simultaneously, a full strength feed of isobutylene and isoprene in a methyl chloride diluent at a temperature above its freezing point at such a rate that said refrigerant completely fills said cooling jacket when the contents of the reactor is a solution of the required concentration of monomers in the methyl chloride; then feeding a solution of aluminum chloride to a point adjacent the point of feed of said full strength feed until the reaction is initiated, said aluminum chloride being in the form of a solution in methyl chloride and at a temperature above the freezing point of said solution; and then feeding such aluminum chloride solution to a point remote from said point of feed of said full strength feed.

The accompanying drawing illustrates an elevation in section of a suitable apparatus for use with the present invention.

In this drawing the reaction vessel 1 is a cylindrical vessel having a large diameter central up-draft tube 2 surrounded by a plurality of small diameter down-draft tubes 3. The up-draft tube 2 and the down-draft tubes 3 provide a plurality of circulating passages, in which the reactor contents circulate in the direction as shown by the arrows. The tubes are surrounded by a cooling jacket 4 through which a refrigerant may pass. Monomeric material enters the reaction vessel by means of inlet tubes 5 and is circulated in the vessel in the manner previously described by a propeller-type agitator 6 which circulates the reactants in the directions shown by the arrows. The catalyst enters by retractable inlet nozzles 7 and 8. These inlet nozzles are shown in dotted lines in the fully inserted position which allows the catalyst be injected to a point adjacent the point of feed of the monomers, introduced through inlet tubes 5, before these monomers are drawn upwardly by agitator 6. These nozzles are also shown initially in the fully retracted position which allows the catalyst to be injected to a point removed from the point of feed of the monomers so as to commingle with the reactants after they have passed downwardly through down-draft tubes 3 and hence are at a lower temperature than the monomers being added through inlet tubes 5. The polymers in the slurry leave the reactor by means of exit pipe 9.

The process of the present invention can best be illustrated by a discussion of a polymerization to produce butyl rubber using cooling jacket temperatures below $-155°$ F.

"Dilute feed streams," that is, as previously defined, solutions containing about 2-6% by weight isobutylene in methyl chloride, chilled to a temperature not lower than $-145°$ F. are introduced into the polymerization reactor vessel 1 through inlet tubes 5, with exit pipe 9 closed, until the reactor circulating passages are substantially full. Exit pipe 9 is then opened and the propeller-type agitator 6 is started. At this time, the flow of refrigerant through the cooling jacket is begun, and "full strength mixed feed" is added through inlet tubes 5. "Full strength mixed feed" is, as previously defined, a solution of methyl chloride containing about 20-30%, preferably about 24-26%, by weight isobutylene and 0.25-1.0% by weight isoprene. The rates of flow of the full strength mixed feed and of the refrigerant are adjusted so that precisely when the refrigerant completely fills the cooling jacket 4 the reactor contents is a solution of methyl chloride containing about 10-12% by weight isobutylene and 0.2-0.5% by weight isoprene. As soon as the cooling jacket 4 is full of refrigerant, the flow of catalyst to the reactor vessel is begun through retractable inlet nozzles 7 and 8 when in the fully extended position shown by dotted lines.

The temperature of the monomer feed streams entering at 5 is usually maintained at about $-140°$ to $-145°$ F.; the temperature of the reactor contents is about $-152°$ to $-154°$ F. prior to the commencement of the reaction. After the reaction has started and equilibrium has been attained, the temperature of the reactor contents normally rises to about $-146°$ F.

We have found that, using this method of introducing the catalyst, at cooling jacket temperatures below $-155°$ F., the induction period is normally about 10-30 minutes.

Once polymerization has commenced, it is preferable to retract the retractable inlet nozzles to position remote from the point of monomer feed, near the reactor wall, as shown by solid lines, where the catalyst streams commingle with the cooler slurry as it leaves small diameter downdraft tubes 3. The concentration of isoprene is greatest at these points; it is recognized that addition of catalyst at such points will result in the maximum incorporation of isoprene in the molecular structure of the polymer consistent with a given isoprene concentration in the feed or in the reactor contents.

In the polymerization reactions according to the present invention, isoolefins preferred are those containing 4-8 carbon atoms, such as isobutylene, 3-methylbutylene-1, and 4-ethylpentene-1. Suitable multi-olefins for copolymerization with these isoolefins are those containing 4-14 carbon atoms and having at least 2 points of unsaturation; suitable multiolefins are isoprene, butadiene-1,3, piperylene, hexadiene-2,4, dimethallyl, cyclopentadiene, myrcene, and 6,6-dimethylfulvene.

The most useful polymers produced by the process of the present invention are those containing 95-99.5 parts by weight of isobutylene with 5-0.5 parts by weight of isoprene. These polymers are what is known as "butyl rubber."

The following examples are given to illustrate the invention.

*Example 1*

A "dilute feed" consisting of 95.1% by weight methyl chloride of a purity greater than 99% and 4.9% by weight isobutylene whose purity was determined to be 98.5%, was pumped into the reactor until the circulating passages were substantially full. The temperature of this dilute feed stream was maintained at $-142°$ to —144° F. When the reactor circulating passages were substantially full, the exit tube was opened, the agitator was started, the flow of refrigerant at a temperature of —160° F. to the cooling jacket was begun, and the "dilute feed" was replaced by a "full strength feed." The temperature of the "full strength feed" was held at —143° to —144° F. Its composition was 24.1–24.3% by weight of 98.5% pure isobutylene and 0.97–1.01% by weight of 96.0% pure isoprene, the remainder being methyl chloride of a purity greater than 99%. The flow of the full strength feed stream was adjusted to the flow of refrigerant to the cooling jacket so that, at the moment the refrigerant had completely filled the cooling jacket, the composition of the reactor contents was about 11% by weight isobutylene, about 0.4% by weight isoprene and the remainder methyl chloride. The catalyst, consisting of a 0.28–0.31% solution of aluminum chloride in methyl chloride at a temperature of —112° to —117° F., was introduced into the reactor as soon as the refrigerant completely filled the cooling jacket. The catalyst was added according to the method of the present invention whereby the retractable inlet nozzles were in the fully inserted position so that the catalyst commingled with the full strength feed stream at a temperature of —143° to —144° F. before this full strength feed stream was drawn upwardly by the mechanical stirrer.

There was an 18 minute induction period before the reaction started.

*Example 2*

The method of Example 1 was repeated but the reactor refrigerant temperature, instead of being —160° F. was —170° F. The reaction was initiated in 20 minutes.

*Example 3*

The method of Example 1 was repeated except that the catalyst was injected at all times with the retractable inlet nozzles in the fully retracted position, allowing the catalyst to commingle at all times with the mixed contents at the reactor temperature.

There was a 124 minute induction period before the reaction started.

What is claimed is:

1. A method for the low temperature catalytic polymerization of an isomonoolefinic hydrocarbon containing 4–8 carbon atoms and a terminal methylene group connected by a double bond to a carbon atom, in a reaction zone having circulating passages and cooling passages, comprising the following steps in sequence: (A), feeding into the reaction zone, so as substantially to fill said circulating passages, a pre-cooled solution of said isomonoolefinic hydrocarbon reactant in an inert diluent which is a non-solvent for the final polymer, said solution being fed at a temperature above its freezing point; (B), circulating said solution through said passages; (C), circulating in said cooling passages a refrigerant at a temperature more than 10 Fahrenheit degrees below the freezing point of the contents of the reaction zone; (D), feeding into the reaction zone a pre-cooled solution of a Friedel-Crafts catalyst to a point adjacent the point of feed of said isomonoolefinic hydrocarbon to commingle said catalyst with said hydrocarbon feed solution before said hydrocarbon feed solution is substantially dispersed, until the reaction is initiated, said catalyst being fed in the form of a solution in an inert diluent which is a non-solvent for the final polymer and at a temperature above the freezing point of said catalyst solution; and (E), discontinuing feeding the catalyst at the point adjacent the point of entry of reactant feed and (F) commencing feeding such catalyst solution to a point remote from said point of entry of reactant feed.

2. A method for the low temperature catalytic polymerization of an isomonoolefinic hydrocarbon containing 4–8 carbon atoms and a terminal methylene group connected by a double bond to a carbon atom, in a reaction zone having circulating passages and cooling passages, comprising the following steps in sequence: (A), feeding into the reaction zone, so as substantially to fill said circulating passages, a pre-cooled solution of said isomonoolefinic hydrocarbon reactant in an inert diluent which is a non-solvent for the final polymer, said solution being fed at a temperature above its freezing point; (B), circulating said solution through said passages; (C), circulating, in said cooling passages, a refrigerant at a temperature more than 10 Fahrenheit degrees below the freezing point of the contents of the reaction zone; (D), feeding into the reaction zone a pre-cooled solution of a Friedel-Crafts catalyst to a point adjacent the point of entry of said isomonoolefinic hydrocarbon to commingle said catalyst with said hydrocarbon feed solution before said hydrocarbon feed solution is substantially dispersed, until the reaction is initiated, said catalyst being fed in the form of a solution in an inert diluent which is a non-solvent for the final polymer and at a temperature above the freezing point of said catalyst solution; and (E), discontinuing feeding the catalyst at the point adjacent the point of entry of reactant feed and (F) commencing feeding such catalyst solution to a point remote from said point of entry of isomonoolefinic reactant and continuing the feeding of the solutions of isomonoolefinic hydrocarbon and catalyst, each at a temperature above its own freezing point.

3. A method for the low temperature catalytic copolymerization of an isomonoolefinic hydrocarbon containing 4–8 carbon atoms and a terminal methylene group connected by a double bond to a carbon atom and a multi-olefinic hydrocarbon containing 4–14 carbon atoms and a terminal methylene group connected by a double bond to a carbon atom, in a reaction zone having circulating passages and cooling passages, comprising the following steps in sequence: (A), feeding into the reaction zone, so as substantially to fill said circulating passages, a pre-cooled dilute feed of said isomonoolefinic hydrocarbon in an inert diluent which is a non-solvent for the final polymer, said dilute feed being fed at a temperature above its freezing point; (B), circulating said solution through said circulating passages; (C), circulating, in said cooling passages, a refrigerant at a temperature more than 10 Fahrenheit degrees below the freezing point of the contents of the reaction zone and feeding, substantially simultaneously, into the reaction zone a pre-cooled full-strength reactant feed of said isomonoolefinic hydrocarbon and said multi-olefinic hydrocarbon in an inert diluent which is a non-solvent for the final polymer at such a rate that said refrigerant solution completely fills said cooling passages when the content of the reaction zone is a solution of the required concentration of monomers; (D), feeding into the reaction zone a pre-cooled solution of a Friedel-Crafts catalyst to a point adjacent the point of entry of said reactant feed to commingle said catalyst with said reactant feed solution before said reactant feed solution is substantially dispersed, until the reaction is initiated, said catalyst being fed in the form of a solution in an inert diluent which is a non-solvent for the final polymer and at a temperature above the freezing point of said catalyst solution; and (E), discontinuing feeding the catalyst at the point adjacent the point of entry of reactant feed and (F) commencing feeding such catalyst solution to a point remote from the point of entry of said reactant feed.

4. A method for the low temperature catalytic copolymerization of an isomonoolefinic hydrocarbon containing 4–8 carbon atoms and a terminal methylene group connected by a double bond to a carbon atom and a multi-olefinic hydrocarbon containing 4–14 carbon atoms and a terminal methylene group connected by a double bond to a carbon atom, in a reaction zone having circulating passages and cooling passages, comprising the following steps in sequence: (A), feeding into the reaction zone, so as substantially to fill said circulating passages, a pre-cooled dilute feed of said isomonoolefinic hydrocarbon in an inert diluent which is a non-solvent for the final polymer, said dilute feed being fed at a temperature above its freezing point; (B), circulating said solution through said circulating passages; (C), circulating in said cooling passages, a refrigerant at a temperature more than 10 Fahrenheit degrees below the freezing point of the contents of the reaction zone and feeding, substantially simultaneously, into the reaction zone a pre-cooled full-strength reactant feed of said isomonoolefinic hydrocarbon and said multiolefinic hydrocarbon in an inert diluent which is a non-solvent for the final polymer at such a rate that said refrigerant solution completely fills said cooling passages when the content of the reaction zone is a solution of the required concentration of monomers; (D), feeding into the reaction zone a pre-cooled solution of a Friedel-Crafts catalyst to a point adjacent the point of entry of said reactant feed to commingle said catalyst with said reactant feed solution before said reactant feed solution is substantially dispersed, until the reactant is initiated, said catalyst being fed in the form of a solution in an inert diluent which is a non-solvent for the final polymer and at a temperature above the freezing point of said catalyst solution; (E), discontinuing feeding the catalyst at the point adjacent the point of entry of reactant feed and (F) commencing feeding such catalyst solution to a point remote from the point of entry of said reactant feed; and (G), continuing the feeding of the reactant feed and the catalyst solution, each at a temperature above its own freezing point.

5. A method as claimed in claim 3 in which said inert diluent is methyl chloride.

6. A method as claimed in claim 3 in which said catalyst is aluminum chloride.

7. A method for the low temperature catalytic copolymerization of isobutylene and isoprene, in a reaction zone having circulating passages and cooling passages, comprising the following steps in sequence: (A), feeding into the reaction zone so as substantially to fill said circulating passages, a pre-cooled dilute feed of said isobutylene in a methyl chloride diluent, said dilute feed being fed at a temperature above its freezing point; (B), circulating said solution in said circulating passages; (C), circulating in said cooling passages a refrigerant at a temperature more than 10 Fahrenheit degrees below the freezing point of the contents of the reaction zone and feeding, substantially simultaneously, into the reaction zone a pre-cooled full-strength reactant feed of isobutylene and isoprene in a methyl chloride diluent at a temperature above its freezing point at such a rate that said refrigerant completely fills said cooling passages when the content of the reaction zone is a solution of the required concentration of monomers in the methyl chloride; (D), feeding into the reaction zone a pre-cooled solution of aluminum chloride to a point adjacent the point of entry of said full strength feed to commingle said aluminum chloride catalyst with said reactant feed solution before said reactant feed solution is substantially dispersed, until the reaction is initiated, said aluminum chloride being in the form of a solution in methyl chloride and at a temperature above the freezing point of said solution; and (E), discontinuing feeding the aluminum chloride catalyst at the point adjacent the point of entry of reactant feed and (F) commencing feeding such aluminum chloride solution to a point remote from the point of entry of said reactant feed.

8. A method for the low temperature catalytic copolymerization of isobutylene and isoprene, in a reaction zone having circulating passages and cooling passages, comprising the following steps in sequence: (A), feeding into the reaction zone so as substantially to fill said circulating passages, a pre-cooled dilute feed containing less than 8% by weight isobutylene in a methyl chloride diluent, said dilute feed being fed at a temperature above its freezing point; (B), circulating said solution in said circulating passages; (C), circulating in said cooling passages a refrigerant at a temperature more than 10 Fahrenheit degrees below the freezing point of the contents of the reaction zone and feeding, substantially simultaneously, into the reaction zone a pre-cooled full-strength reactant feed of isobutylene and isoprene in a methyl chloride diluent at a temperature above its freezing point at such a rate that said refrigerant completely fills said cooling passages when the content of the reaction zone is a solution of the required concentration of monomers in the methyl chloride; (D), feeding into the reaction zone a pre-cooled solution of aluminum chloride to a point adjacent the point of entry of said full-strength reactant feed to commingle said aluminum chloride catalyst with said reactant feed solution before said reactant feed solution is substantially dispersed, until the reaction is initiated, said aluminum chloride catalyst being in the form of a solution in methyl chloride and at a temperature above the freezing point of said solution; and (E), discontinuing feeding the aluminum chloride catalyst at the point adjacent the point of entry of reactant feed and (F) commencing feeding such aluminum chloride catalyst solution to a point remote from said point of entry of said reactant feed.

9. A method for the low temperature catalytic copolymerization of isobutylene and isoprene, in a reaction zone having circulating passages and cooling passages, comprising the following steps in sequence: (A), feeding into the reaction zone, so as substantially to fill said circulating passages, a pre-cooled dilute feed containing 4–6% by weight isobutylene in a methyl chloride diluent, said dilute feed being fed at a temperature above its freezing point; (B), circulating said solution in said circulating passages; (C), circulating, in said cooling passages, a refrigerant at a temperature more than 10 Fahrenheit degrees below the freezing point of the contents of the reaction zone and feeding, substantially simultaneously, into the reaction zone a pre-cooled full-strength reactant feed of isobutylene and isoprene in a methyl chloride diluent at a temperature above its freezing point at such a rate that said refrigerant completely fills said cooling passages when the contents of the reaction zone is a solution of the required concentration of monomers in the methyl chloride; (D), feeding into the reaction zone a pre-cooled solution of aluminum chloride to a point adjacent the point of entry of said full-strength reactant feed to commingle said aluminum chloride catalyst with said reactant feed solution before said reactant feed solution is substantially dispersed, until the reaction is initiated, said aluminum chloride catalyst being in the form of a solution in methyl chloride and at a temperature above the freezing point of said solution; and (E), discontinuing feeding the aluminum chloride catalyst at the point adjacent the point of entry of reactant feed and (F) commencing feeding such aluminum chloride catalyst solution to a point remote from said point of entry of said reactant feed.

10. A method for the low temperature catalytic copolymerization of isobutylene and isoprene, in a reaction zone having circulating passages and cooling passages, comprising the following steps in sequence: (A), feeding into the reaction zone so as substantially to fill said circulating passages, a pre-cooled dilute feed containing 4–6% by weight isobutylene in a methyl chloride diluent, said dilute feed being fed at a temperature above its freezing point; (B), circulating said solution in said circulating passages; (C), circulating, in said cooling passages, a refrigerant at a temperature more than 10 Fahrenheit degrees below the freezing point of the contents of the reaction zone and feeding, substantially simultaneously, into the reaction zone a pre-cooled full-strength reactant feed containing 20–40% by weight isobutylene and 0.2–2.0% by weight isoprene in a methyl chloride diluent at a temperature above its freezing point at such a rate that said refrigerant completely fills said cooling passages when the content of the reaction zone is a solution of the required concentration of monomers in the methyl chloride; (D), feeding into the reaction zone a pre-cooled solution of aluminum chloride to a point adjacent the point of entry of said full-strength reactant feed to commingle said aluminum chloride catalyst with said reactant feed solution before said reactant feed solution is substantially dispersed, until the reaction is initiated, said aluminum chloride catalyst being in the form of a solution in methyl chloride and at a temperature above its freezing point; and (E), discontinuing feeding the aluminum chloride catalyst at the point adjacent the point of entry of reactant feed and (F) commencing feeding such aluminum chloride catalyst solution to a point remote from said point of entry of said reactant feed.

11. A method for the low temperature catalytic copolymerization of isobutylene and isoprene, in a reaction zone having circulating passages and cooling passages, comprising the following steps in sequence: (A), feeding into the reaction zone, so as substantially to fill said circulating passages, a pre-cooled dilute feed containing 4–6% by weight isobutylene in a methyl chloride diluent, said dilute feed being fed at a temperature above its freezing point; (B), circulating said solution in said circulating passages; (C), circulating in said cooling passages a refrigerant at a temperature more than 10 Fahrenheit degrees below the freezing point of the contents of the reaction zone and feeding, substantially simultaneously, into the reaction zone a pre-cooled full-strength reactant feed containing 24–26% by weight isobutylene and 0.25–1.0% by weight isoprene in a methyl chloride diluent at a temperature above its freezing point at such a rate that said refrigerant completely fills said cooling passages when the content of the reaction zone is a solution of the required concentratiton of monomers in the methyl chloride; (D), feeding into the reaction zone a pre-cooled solution of aluminum chloride to a point adjacent the point of entry of said reactant feed to commingle said aluminum chloride catalyst with said reactant feed solution before said reactant feed solution is substantially dispersed, until the reaction is initiated, said aluminum chloride catalyst being in the form of a solution in methyl chloride and at a temperature above its freezing point; and (E), discontinuing feeding the aluminum chloride catalyst at the point adjacent the point of entry of reactant feed and (F) commencing feeding such aluminum chloride catalyst solution to a point remote from said point of entry of said reactant feed.

12. A method for the low temperature catalytic copolymerization of isobutylene and isoprene, in a reaction zone having circulating passages and cooling passages, comprising the following steps in sequence: (A), feeding into the reaction zone so as substantially to fill said circulating passages, a pre-cooled dilute feed containing 4–6% by weight isobutylene in a methyl chloride diluent, said dilute feed being fed at a temperature above its freezing point; (B), circulating said solution in said circulating passages; (C), circulating in said cooling passages a refrigerant at a temperature more than 10 Fahrenheit degrees below the freezing point of the contents of the reaction zone and feeding, substantially simultaneously, into the reaction zone a pre-cooled full-strength reactant feed containing 24–26% by weight isobutylene and 0.25–1.0% by weight isoprene in a methyl chloride diluent at a temperature above its freezing point at such a rate that said refrigerant completely fills said cooling passages when the content of the reaction zone is a solution containing 10–12% by weight isobutylene and 0.2–0.5% by weight isoprene in the methyl chloride; (D), feeding into the reaction zone a pre-cooled solution of aluminum chloride to a point adjacent the point of entry of said reactant feed to commingle said aluminum chloride catalyst with said reactant feed solution before said reactant feed solution is substantially dispersed, until the reaction is initiated, said aluminum chloride catalyst being in the form of a solution in methyl chloride and at a temperature above its freezing point; and (E), discontinuing feeding the aluminum chloride catalyst at the point adjacent the point of entry of reactant feed and (F) commencing feeding such aluminum chloride catalyst solution to a point remote from said point of entry of said reactant feed.

13. A method for the low temperature catalytic copolymerization of isobutylene and isoprene, in a reaction zone having circulating passages and cooling passages, comprising the following steps in sequence: (A), feeding into the reaction zone, so as substantially to fill said circulating passages, a pre-cooled dilute feed containing 4–6% by weight isobutylene in a methyl chloride diluent, said dilute feed being fed at a temperature not lower than −145° F.; (B), circulating said solution in said circulating passages; (C), circulating, in said cooling passages, a refrigerant at a temperature below −155° F. and feeding, substantially simultaneously, into the reaction zone a pre-cooled full strength reactant feed containing 24–26% by weight isobutylene and 0.25–1.0% by weight isoprene in a methyl chloride diluent at a temperature not lower than −145° F. and at such a rate that said refrigerant completely fills said cooling passages when the content of the reaction zone is a solution containing 10–12% by weight isobutylene and 0.2–0.5% by weight isoprene in the methyl chloride diluent; (D), feeding into the reaction zone a pre-cooled solution containing 0.25–0.5% by weight aluminum chloride in a methyl chloride diluent to a point adjacent the point of entry of said reactant feed to commingle said aluminum chloride catalyst with said reactant feed solution before said reactant feed solution is substantially dispersed, until the reaction is initiated, said aluminum chloride catalyst solution being fed at a temperature of not lower than −130° F.; and (E), discontinuing feeding the aluminum chloride catalyst solution at the point adjacent the point of entry of reactant feed and (F) commencing feeding such aluminum chloride catalyst solution to a point remote from said point of entry of said reactant feed.

14. A method for the low temperature catalytic copolymerization of isobutylene and isoprene, in a reaction zone having circulating passages and cooling passages, comprising the following steps in sequence: (A), feeding into the reaction zone, so as substantially to fill said circulating passages, a pre-cooled dilute feed containing 4–6% by weight isobutylene in a methyl chloride diluent, said dilute feed being fed at a temperature not lower than −145° F.; (B) circulating said solution in said circulating passages; (C), circulating, in said cooling passages, a refrigerant at a temperature below −155° F. and feeding, substantially simultaneously, into the reaction zone a pre-cooled full-strength reactant feed containing 24–26% by weight isobutylene and 0.25–1.0% by weight isoprene in a methyl chloride diluent at a temperature not lower than −145° F. and at such a rate that said refrigerant completely fills said cooling passages when the content of the reaction zone is a solution containing 10–12% by weight isobutylene and 0.2–0.5% by weight isoprene in the methyl chloride diluent; (D) feeding into the reaction zone a pre-cooled solution containing 0.25–0.5% by weight aluminum chloride in a methyl chloride diluent to a point adjacent the point of entry of said reactant feed to commingle said aluminum chloride catalyst with said reactant feed solution before said reactant feed solution is substantially dispersed, until the reaction is initiated, said aluminum chloride catalyst solution being fed at a temperature not lower than −130° F.; and (E), discontinuing feeding the aluminum chloride catalyst at the point adjacent the point of entry of reactant feed and (F) commencing feeding such aluminum chloride catalyst solution to a point remote from said point of entry of said reactant feed and continuing the feeding of the reactant feed and the aluminum chloride catalyst solution, each at a temperature above its own freezing point.

References Cited in the file of this patent

UNITED STATES PATENTS

| | | |
|---|---|---|
| 2,395,079 | Sparks et al. | Feb. 19, 1946 |
| 2,431,461 | Calfee et al. | Nov. 25, 1947 |
| 2,474,592 | Palmer | June 28, 1949 |

FOREIGN PATENTS

| | | |
|---|---|---|
| 582,137 | Great Britain | Nov. 6, 1946 |